Aug. 1, 1967     C. L. LEBLANC ET AL     3,333,708
DISPLAY RACK WITH REMOVABLE INSERT

Filed July 28, 1965     3 Sheets-Sheet 1

INVENTORS.
CONRAD L. LEBLANC
and JACK BLOCH

BY *Patrick L. Henry*

ATTORNEY.

Aug. 1, 1967   C. L. LEBLANC ETAL   3,333,708
DISPLAY RACK WITH REMOVABLE INSERT
Filed July 28, 1965   3 Sheets-Sheet 2
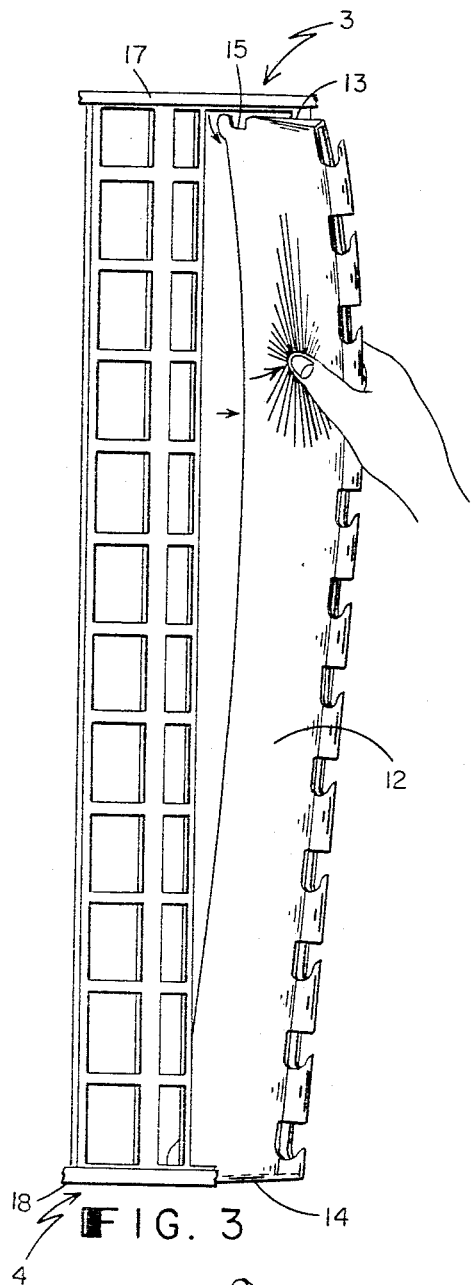
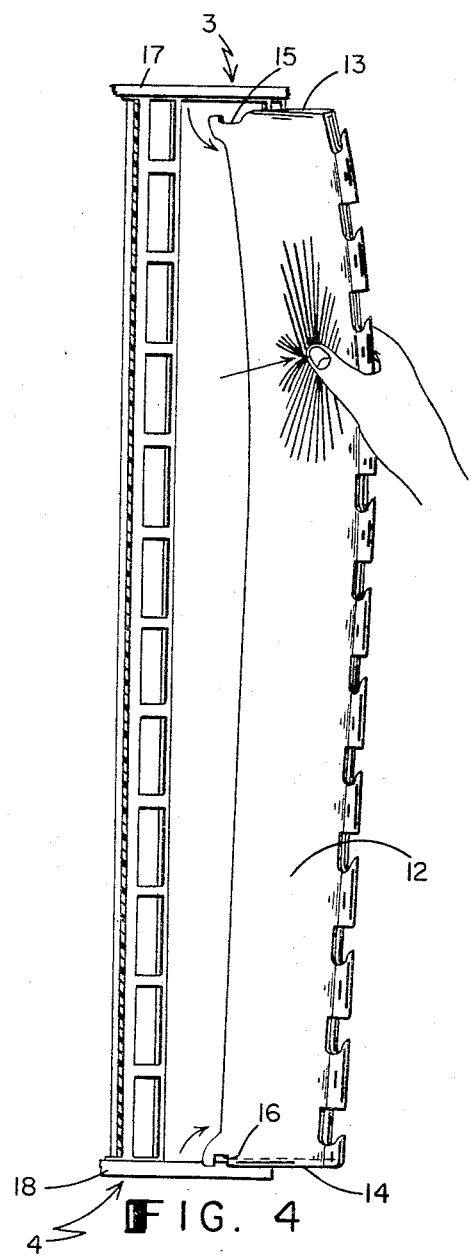
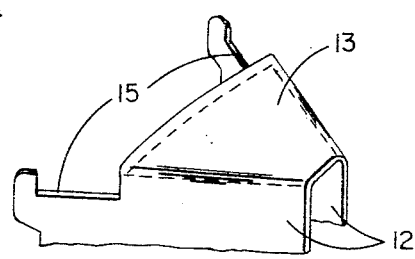
INVENTORS.
CONRAD L. LEBLANC
and JACK BLOCH
BY *Patrick L. Henry*
ATTORNEY.

Aug. 1, 1967   C. L. LEBLANC ETAL   3,333,708
DISPLAY RACK WITH REMOVABLE INSERT
Filed July 28, 1965   3 Sheets-Sheet 3

INVENTORS.
CONRAD L. LEBLANC
and JACK BLOCH
BY *Patrick L. Henry*

ATTORNEY.

United States Patent Office 3,333,708
Patented Aug. 1, 1967

3,333,708
DISPLAY RACK WITH REMOVABLE INSERT
Conrad L. Leblanc and Jack Bloch, Leominster, Mass., assignors to Foster Grant Co., Inc., Leominster, Mass., a corporation of Delaware
Filed July 28, 1965, Ser. No. 475,413
6 Claims. (Cl. 211—13)

This invention relates to a display rack and more particularly to a display rack having removable inserts therefor.

The invention is especially adapted for use as a display rack for sunglasses. The invention comprehends the use of a removable insert adapted to be used in existing display racks to adapt these racks to accommodate wraparound type sunglasses. While the presently preferred embodiment is exemplified as a rack for sunglasses, it will be apparent that the display rack of this invention may be used in conjunction with other articles presenting problems similar to sunglasses.

It is therefore an object of this invention to provide an insert for a display rack which is quickly and easily insertable and removable.

Another object of this invention is to provide an insert for sunglass display racks which permits these racks to accommodate wraparound sunglasses.

Another object of this invention is to provide a display rack having one or more inserts which facilitate the display of wraparound sunglasses and the like.

The foregoing and other objects are achieved in a display rack having one or more inserts which serve to adapt the rack to accommodate wraparound sunglasses and the like. The temples of the glasses are supported on the lattice work of the rack while the nose bridge is supported on ledges formed in the insert. The inserts are removably locked in place on the display rack at the tops and bottoms thereof. The inserts are for the most part resilient and are so constructed that by squeezing an insert intermediate the ends thereof, the locking means clear the rim of the display stand so as to facilitate easy insertion of inserts into the display stand, and removal therefrom.

By the above outlined apparatus several advantages are obtained. The inserts may be quickly and easily affixed to existing stands. Assembly of new stands and inserts is facilitated. Different inserts may be provided to adapt the rack for different uses and articles. The insert is easily molded and does not require separate attaching means to lock it in place on the display rack.

Other objects and features of the invention will become apparent by reference to the following specification and to the drawings.

In the drawings:

FIG. 3 is an elevation from a different angle showing the insert as the top portion thereof is being withdrawn from under the top sides of the display rack.

FIG. 4 is a view similar to FIG. 3 showing the insert after it is withdrawn from the display rack.

FIG. 7 is an enlarged view of the top portion of an insert.

Figure 1:
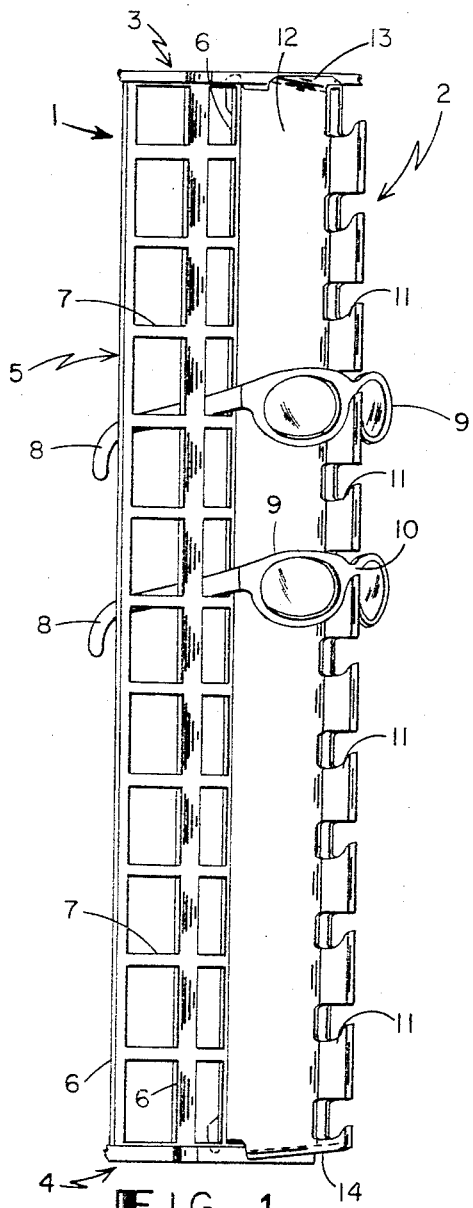
FIG. 1 is a perspective view of a portion of the rack with an insert in place therein.

In the presently preferred embodiment, a display rack 1 of the type shown in U.S. Patent No. 2,808,941 is provided with a plurality of resilient nose bridge support inserts 2 adapted to support the nose bridges of glasses and to be removably locked on the rack 1.

The display rack 1 includes a top hub member 3 and a bottom hub member 4 and a plurality of lattice members 5 connecting said hub members 3, 4 and supporting them in spaced relation to one another.

The lattice members 5 each include a plurality of spaced vertical ribs 6 and horizontal ribs 7, forming openings to receive temples of sunglasses. The horizontal ribs 7 serve the function of supporting the temple members 8 of sunglasses 9 which are displayed in the rack 1. The nose bridge 10 of the sunglasses 9 is supported on the ledge 11 of the nose bridge support 2. As seen in FIG. 1, the sunglasses are displayed and supported on the horizontal ribs 7 of lattice members 5 and ledges 11 of inserts 2.

The resilient nose bridge support inserts 2 are presently molded in one piece from a flexible resin such as, polystyrene, high impact polystyrene, polypropylene, polyethylene, nylon, etc. The inserts are comprised of two rearwardly extending side elements 12 which are angularly disposed with respect to each other. The side elements 12 are connected at the top and bottom ends thereof by upper cross element 13, and lower cross element 14. These cross elements are short and relatively rigid with respect to the side elements 12, and thus serve to maintain the ends of the side elements in substantially fixed lateral spaced relation to one another. The lateral extremities of the side elements 12 contain locking notches 15 and 16 which cooperate with the rim portions 17 and 18 of hubs 3, 4 to removably maintain the inserts 2 in fixed position on the display rack 1.

Figure 2:
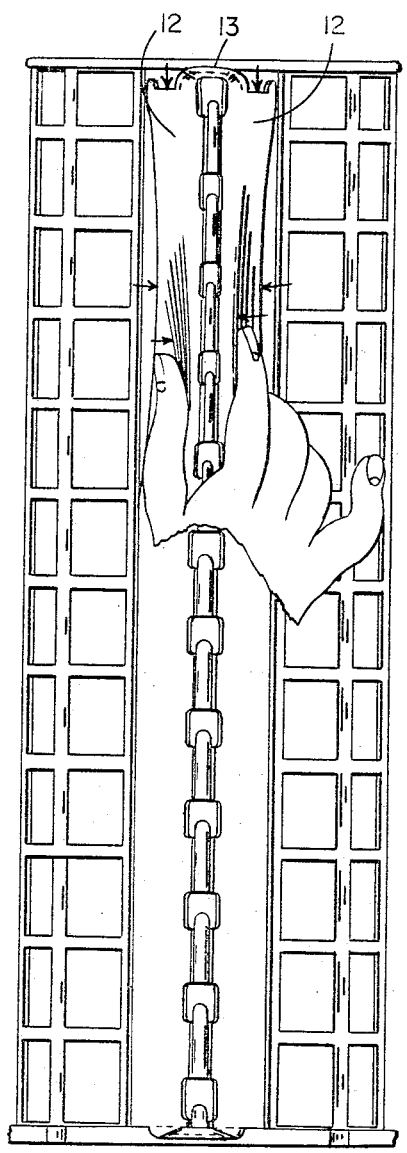
FIG. 2 is an elevation similar to FIG. 1 showing the insert as it is squeezed to bring the locking notches out of engagement with the display rack.
Figure 9:
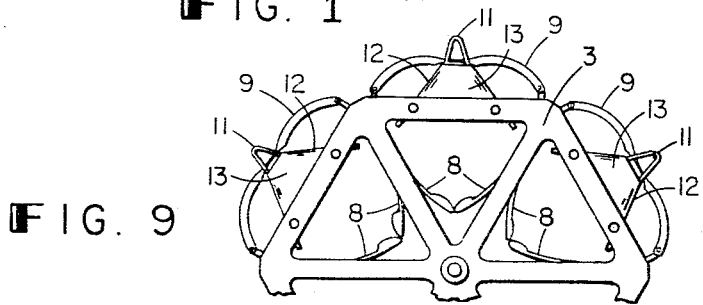
FIG. 9 is a partial plan view of a display rack with a plurality of inserts mounted thereon.
Figure 5:
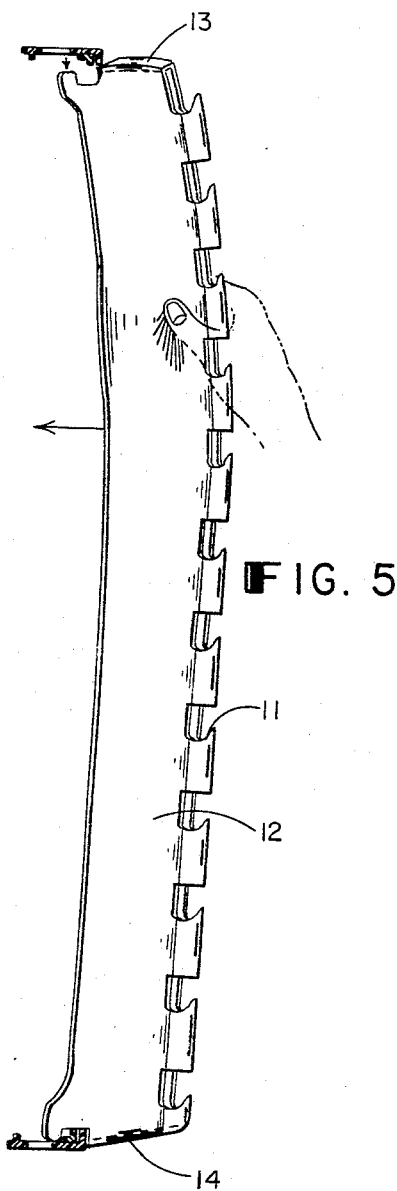
FIG. 5 is a view showing the insert immediately prior to insertion.
Figure 6:
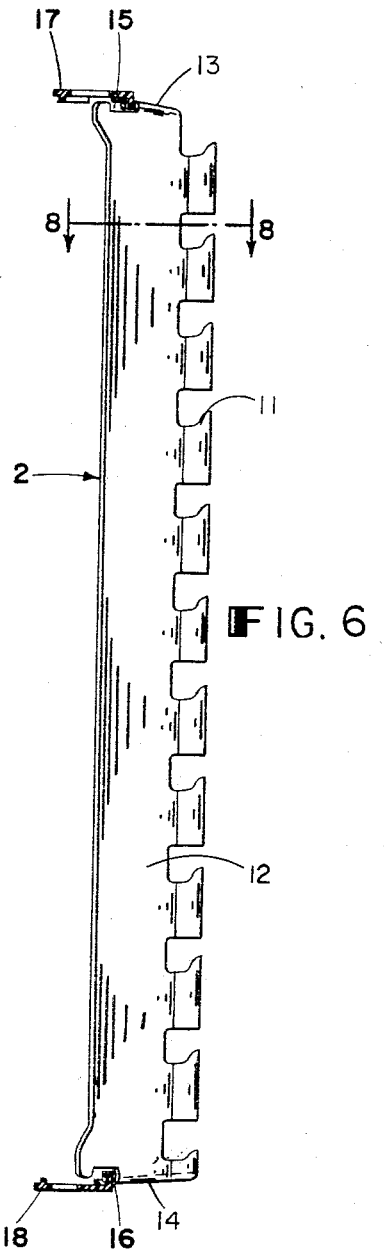
FIG. 6 is a view similar to FIG. 5 showing the insert in locked position on the rack.
Figure 8:
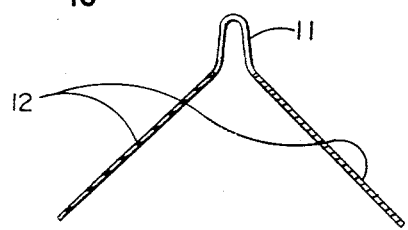
FIG. 8 is a sectional view taken along lines 8—8 of FIG. 6.

The components of this invention are assembled substantially as follows:

FIG. 6 shows an insert 2 in its undeformed state in place on the display rack 1. It is noted that in this position the locking notches 15 and 16 cooperate with the rim portions 17 and 18 of hub members 3 and 4 to maintain the insert 2 locked in place on the display rack 1. In order to insert or remove the nose bridge support 2, it is necessary merely to squeeze the side portions 12 together intermediate the ends thereof. (See FIG. 2.) It is preferable to squeeze these two portions together at a distance about one-third of the way down from the top of the nose bridge support. This squeezing action shortens the vertical distance between the top and bottom locking notches 15 and 16 sufficiently to allow the top locking notches 15 to clear the rim portion 17 of hub 3 when the bottom notches 16 are in locking engagement with rim portion 18. (See FIG. 3.) When an insert is to be inserted into the rack the bottom notches 16 are initially inserted into position on rim portion 18; and the top locking notches 15 of top portion of the nose bridge support are then moved into alignment with the rim portion 17 of hub 3. Upon alignment of these two members the pressure on the side portions 12 is released thereby allowing the top locking notches 15 to spring into engagement with rim 17. (See FIGS. 1 and 6.) By squeezing the side portions, withdrawing the top portion, and subsequently withdrawing the bottom portion of the insert 2, the display rack can be disassembled as easily as it was assembled.

As is apparent from the drawings and the above specification, a merchandizing display rack has been provided which is easily and economically manufactured, and which has inserts which may be quickly and easily inserted and removed. The foregoing description is to be consid-

What is claimed is:
1. A merchandising stand for glasses and the like comprising:
a display rack;
said display rack including a top hub member and a bottom hub member;
a plurality of spaced upstanding lattice members connecting said top and bottom hub members;
said lattice members including a plurality of vertically and horizontally spaced ribs;
a resilient support member adapted to be removably locked on said stand for supporting the nose bridges of glasses;
said support member including two rearwardly extending side elements angularly disposed with respect to each other with ledges at the apex thereof;
said side elements being connected adjacent the top and bottom ends thereof by cross elements which serve to maintain the ends of said side elements in substantially fixed angular relation;
locking notches located at the lateral extremities of the ends of the side elements;
said hub members further including rim portions adapted to engage said notches to retain said support members in position on said rack;
said support members being locked on said display rack by interengagement of said locking notches of said support member with the rim portions of the hub members.

2. The device according to claim 1 wherein the support member for said nose bridges includes a series of ledges adjacent the juncture of the side elements; said ledges cooperating with said horizontal ribs whereby the temples of glasses are supported on said ribs while the nose bridges thereof are supported on the ledges of said support members.

3. A merchandising stand for glasses and the like comprising a display rack including:
a top hub member and a bottom hub member;
a plurality of spaced upstanding lattice members connecting said top and bottom hub members;
a resilient support member adapted to be removably locked on said stand for supporting the nose bridges of glasses;
said support member including two rearwardly extending side elements;
said side elements being connected at the ends thereof by cross elements which serve to maintain the ends of said side elements in substantially fixed spaced relation;
locking notches located at the lateral extremities of the ends of the side elements;
said hub members further including rim portions adapted to engage said notches to retain said support members on said rack;
said support members being locked on said display rack by interengagement of said locking notches of said support member with the rim portions of the hub members.

4. A merchandising stand for glasses and the like comprising a display rack including:
a top hub member and a bottom hub member;
a plurality of spaced upstanding members with vertically spaced openings connecting said top and bottom hub members;
a resilient support member adapted to be removably locked on said stand and having means to support the nose bridges of glasses;
said support member including two rearwardly extending side elements;
said side elements being connected adjacent the ends thereof by cross elements which serve to maintain the ends of said side elements in substantially fixed spaced relation;
locking notches located at the lateral extremities of the ends of the side elements;
said hub members having means to engage and retain said support members;
said support members being locked on said display rack by interengagement of said locking notches of said support member with the hub members.

5. An insert for a display rack, said insert comprising:
a resilient elongated support member;
said support member including spaced resilient side elements angularly disposed in relation to each other with ledges at the apex of the elements;
locking notches located adjacent the lateral extremities of the ends of the side members for locking said insert to a supporting rack;
cross elements connecting the ends of said side elements and maintaining the sides thereof in angular spaced relation to one another;
whereby the ends of the support member are drawn together relative to each other upon the side elements being squeezed intermediate the ends thereof; thereby allowing the locking notches to be inserted into or withdrawn from locking engagement with a display rack.

6. An insert for a display rack comprising:
a resilient elongated support member;
said support member including spaced resilient side elements having support ledges;
locking means located adjacent the lateral extremities of the ends of the side members for locking said insert to a supporting rack;
cross elements connecting the side elements adjacent the ends and maintaining said side elements in substantially fixed, spaced relationship in such manner that opposite ends of the support members are drawn together upon the side elements being squeezed intermediate the ends thereof;
whereby the locking means may be inserted into or withdrawn from locking engagement with a display rack.

References Cited

UNITED STATES PATENTS

| | | | |
|---|---|---|---|
| 2,630,914 | 3/1953 | Bekoff | 206—45.14 X |
| 2,808,941 | 10/1957 | Foster | 211—13 |
| 2,872,030 | 2/1959 | Dumont | 206—45.14 |
| 3,002,609 | 10/1961 | Batkin | 206—45.14 |
| 3,040,881 | 6/1962 | McNeill | 206—80 |

CHANCELLOR E. HARRIS, *Primary Examiner.*

CLAUDE A. LE ROY, *Examiner.*

W. D. LOULAN, *Assistant Examiner.*